United States Patent Office

3,786,012
Patented Jan. 15, 1974

3,786,012
AQUEOUS EMULSION POLISH COMPOSITIONS
Donald L. Marion, Homewood, Lawrence R. Hanson, Park Forest, and Robert C. Strand, Homewood, Ill., assignors to Atlantic Richfield Company, New York, N.Y.
No Drawing. Continuation of application Ser. No. 84,915, Oct. 28, 1970, which is a continuation of application Ser. No. 728,811, May 13, 1968, both now abandoned. This application Mar. 31, 1972, Ser. No. 240,271
Int. Cl. C08f 45/28, 45/52
U.S. Cl. 260—28.5                         10 Claims

ABSTRACT OF THE DISCLOSURE

Aqueous emulsion compositions useful, for example, as floor polishes and containing polymeric film-former, a carboxyl group-containing leveling resin, a hydrocarbon wax and a carboxyl group-reactive complexing metal are improved in terms of their ability to provide films exhibiting excellent detergent resistance and ammonia-removability by employing as the leveling resin an about 50 to 100 percent half-esterified copolymer of styrene and maleic anhydride, the esterifying alcohol being an aliphatic, monohydric alcohol of 1 to about 10 carbon atoms, e.g., n-propanol, the molar ratio of styrene to maleic anhydride in said copolymer being about 1.5 to 2.5:1 and said copolymer having a molecular weight of about 600 to 6000 and an acid number of about 175 to 275. Suitable carboxyl-reactive complexing metals include, for example, zinc and zirconium and these may advantageously be supplied to the composition in the form of complexes of said metals with ammonium and carbonate ions.

---

This is a continuation of application Ser. No. 84,915 filed Oct. 28, 1970 which in turn is a continuation of application Ser. No. 728,811, filed May 13, 1968, both of which are now abandoned.

The present invention relates to improved, deteregnt resistant polish compositions. More particularly, it relates to those aqueous emulsion compositions, useful, for example, as floor polishes, wherein detergent resistance of coatings applied therewith is achieved by the use of a combination of a carboxyl group-containing leveling agent and a carboxyl group-reactive complexing metal, e.g., ammonium zirconyl carbonate, and involves the use of a partially-esterified copolymer of styrene and maleic anhydride as the leveling agent.

Recent technological development in the floor polish industry has established the concept of detergent resistant, ammonia-removable polish. Products of this type exhibit a high degree of detergent resistance but, when desired, can easily be removed by adding household ammonia to the floor washing solution. Improved floor maintenance can be achieved by mopping with detergent solution, which facilitates removal of soil and heel marks and thereby extends the service life of the polish. In contrast thereto, former polish compositions provided finishes which were easily removed by detergent solutions and, therefore, could be cleansed by damp mopping with water.

These floor polish compositions are most often aqueous systems based on fine particle size emulsions containing synthetic, polymeric film-formers and leveling resins in combination with a hydrocarbon wax component. The above-mentioned properties of detergent resistance and ammonia removability are, according to the systems with which the present invention is concerned, supplied to these polish compositions by the incorporation therein of a carboxyl group-containing leveling resin and a carboxyl group-reactive complexing metal. While the mechanism by which the complexing metal provides detergent resistance to the dried coatings is not known for certain, it is generally thought that the metal forms complex compounds with a plurality of carboxyl groups supplied by the leveling resin and thereby effects a type of ionic cross-linking of the resin molecules. Where the polymeric film-former also contains carboxyl groups, as is often preferred, it too is complexed with the metal and enters into the crosslinked network. Thus, while detergent solutions are ineffective to dissolve or emulsify the crosslinked network, more strongly basic solutions such as aqueous ammonia will effect breaking of the complex bonds and solubilization or emulsification of the leveling resin and film-former residua. Aqueous emulsion polishes based on this system have not been without their drawbacks however. Heretofore, for instance, they have been seriously deficient in regard to shelf-life stability for the liquid polish compositions and in regard to retention of the ammonia-removable characteristic of films applied therewith; also, the degree of detergent resistance of the films has left something to be desired. Thus, there has been sought a method of improving the stability of the emulsions during storage, as well as means by which the ammonia-removable property of freshly applied films can be retained over a much longer period of time and their detergent resistance improved.

It has now been found that improved detergent resistance and longer retention of ammonia-removability can be provided the above-mentioned polish compositions without sacrificing emulsion stability by employing as the carboxyl group-containing leveling resin a low molecular weight copolymer of styrene and maleic anhydride which has been about 50 to 100, preferably about 60 to 75, percent half-esterified with an aliphatic (including cyclo-aliphatic), monohydric alcohol of 1 to about 10, preferably1 to about 5, carbon atoms. The copolymer, prior to esterification, has a molecular weight of about 600 to 6000, preferably about 600 to 2500, and a molar ratio of styrene to maleic anhydride of about 1.5 to 2.5:1, preferably approximately 2:1; the esterified copolymer has an acid number (determined as milligrams of KOH required to neutralize one gram of partially esterified copolymer) of about 175 to 275, preferably about 180 to 250. Preferred esterifying alcohols are monohydric alkanols such as n-propanol, n-butanol, etc.

As stated above, the basic components of the aqueous emulsion polish composition which is improved by utilizing the leveling resin of the present invention are a polymeric film-former, the carboxyl group-containing leveling resin, a hydrocarbon wax and a carboxyl group-reactive complexing metal. The emulsion is alkaline in nature, having a pH of greater than 7 and often as high as about 10. To maintain stability of the emulsion, it may be preferable or even necessary with some complexing metals to provide a lower pH than with other metals. Thus, for example, when using zirconium as the complexing metal the pH of the emulsion should be no higher than about 8.5 and advantageously should be within the range of about 7.5 to 8. On the other hand, when zinc is used as the complexing metal an emulsion pH as high as about 10 can often be employed, with the range of about 8.5 to 9.5 being preferred.

THE POLYMERIC FILM FORMER

The polymeric film-forming component in the improved composition of the present invention can be any of the emulsifiable, synthetic polymers conventionally employed in aqueous emulsion polish compositions. Such polymers include those obtained by addition polymerization of vinyl monomers, e.g., styrene, methyl styrene, divinylbenzene, and other vinyl aromatics, acrylic acids and esters, substituted acrylic acids and esters, vinyl halides, vinyl esters, etc. Examples of suitable film-formers include polystyrene, styrene-acrylic acid copolymers, ethylacrylate-acrylic acid copolymers, ethyl acrylate-methacrylic acid copolymers, styrene-methacrylic acid copolymers, etc. Preferably, the film-former will, like the leveling resin, be a carboxyl group-containing polymer such as those composed of polymerized acrylic acid, methacrylic acid, itaconic acid, etc. Advantageously, about 1 to 10% of the monomer units in the film-forming polymer will be carboxyl group-containing monomer units, and often about 2 to 7% will contain carboxyl groups. By the expression "carboxyl groups" as used herein and in the claims is meant unesterified carboxylic acid groups, including carboxylic acid groups which have been neutralized to their salt forms.

Often preferred film-forming polymers are those prepared by addition polymerization of olefinically-unsaturated monomers of 2 to 3 to about 12, preferably about 4 to 8, carbon atoms. And, as stated above, preferably one or more of the monomers will be carboxyl group-containing. Suitable such polymers are disclosed, for example, in U.S. Pat. No. 2,754,280 to Brown et al.

The polymerization systems most often employed to produce the polymeric film-former used in the composition of the present invention are those systems wherein addition polymerization (including co- or interpolymerization) is effected in the presence of an emulsion polymerization catalyst, emulsifiers and water. These systems have the advantage of preparing an already emulsified polymeric film-former, which emulsion, after treatment, say, to remove or quench unexpired catalyst, may be used directly in formulating the polish composition. Ordinarily, the film-forming polymers have a molecular weight of about 10,000 to 50,000 and are preferably in a finely-divided form, that is, characterized by a particle size in emulsion of about 0.2 to 1 micron, most preferably about 0.4 to 0.6 micron.

While the ratios of the various components in the polish compositions may vary widely, polymeric film-former will generally comprise about 50 to 90, often about 65 to 80, percent of the composition, based on non-volatile materials (NVM).

THE LEVELING RESIN

The partially esterified styrene-maleic anhydride copolymer which provides the leveling resin component of the invention is, as mentioned above, a low molecular weight resin having about 1.5 to 2.5 moles of styrene per mole of maleic anhydride and an unesterified molecular weight of about 600 to 6000. The copolymer of styrene and maleic anhydride can be prepared by dissolving the styrene and maleic anhydride in a suitable solvent, employing as a polymerization catalyst a free-radical peroxide catalyst, preferably benzoyl peroxide or dicumyl peroxide, at a temperature of about 85 to 230° C. or more. Suitable solvents include the aromatic hydrocarbon solvents, which can be either the active aromatic solvents, that is, containing an active hydrogen atom, such as cumene, p-cymene, etc., or the non-active aromatics, such as xylene, toluene, etc. The active aromatic solvents are chain-terminating solvents and give lower molecular weight products. Other suitable solvents are the ketones, such as methylethylketone, which are also active solvents. The preferred manner of carrying out the polymerization is by what is known in the art as incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the products necessitates a solvent-stripping operation.

The esters of the styrene-maleic anhydride copolymer can be prepared by reacting the monohydric alcohol with the copolymer under either bulk or solvent conditions. The reaction temperature may vary depending upon whether a solvent is used, the styrene to maleic anhydride ratio in the copolymer, the particular alcohol employed, etc. Generally, esterification reaction temperatures of about 320 to 400° F., often about 340 to 360° F., can be employed. Advantageously, an esterification catalyst such as lithium acetate can be employed.

The partially esterified styrene-maleic anhydride copolymers are soluble in alkaline aqueous media and, particularly, in the alkaline polish compositions of the present invention. In addition to this particular leveling resin, it is to be understood that other leveling resins can be used as well. Thus, blends of the partially esterified styrene-maleic anhydride copolymer with, for example, thermoplastic polyester leveling resins may be employed. While leveling resin amounts may vary within wide limits, depending upon the particular polish formulation, generally the partially esterified styrene-maleic anhydride copolymer will be present in the polish composition in amounts of about 10 to 45, preferably about 15 to 35, weight percent, based on non-volatile materials.

THE HYDROCARBON WAX

The waxes that may be employed in the polish composition of the present invention are emulsifiable, essentially hydrocarbonaceous waxes. They may be either crystalline or amorphous in structure and may be of mineral, animal or vegetable origin, or, as is often preferred, may be synthetically derived. The particular waxes selected will depend on the physical properties desired in the applied emulsion. The waxes which are normally used include, for example, beeswax, ozokerite, microcrystalline wax, paraffin wax, carnauba wax, etc. Preferred waxes include emulsifiable, waxy, polymeric materials such as polyethylene wax or Fisher-Tropsch waxes. The polyethylene waxes employed generally have a molecular weight of about 3000 to 15,000. Waxy copolymers of ethylene and addition polymerizable, polar group containing monomer, e.g., vinyl esters and acrylic acid esters, may also be used if desired. Advantageously, the hydrocarbon wax will also be a carboxyl group-containing wax. Carboxylated waxes are well known and are often derived by oxidation of the hydrocarbon wax, for example polyethylene wax, or, in the case of waxes obtained from addition polymerization of olefinic monomers, by inclusion of minor amounts of copolymerizable, olefinically-unsaturated carboxylic acids, such as acrylic acid, methacrylic acid, etc., in the polymerization mixture. Thus, it is often preferred that carboxyl group-containing hydrocarbon waxes having an acid number of at least about 5 be employed.

Examples of suitable synthetic waxes and methods of preparing same are those disclosed, for example, in U.S. Pat. No. 2,504,400 to Erchak et al. and U.S. Pat. Nos. 2,683,141 and 2,712,534 to Erchak.

Generally, the hydrocarbon wax will comprise about 1 to 20, preferably about 3 to 15, percent of the polish composition, based on non-volatile materials.

THE COMPLEXING METAL

The polish compositions with which the present invention is concerned are those wherein the complexing agent which lends detergent resistance to the applied films is a carboxyl group-reactive, complexing metal selected from the group consisting of metals of Groups I–B, II–B, III–B, IV–B, V–B, VI–B and VIII of the Periodic Table having an atomic number of 21 to 78. Examples of suitable such metals include, for instance, zirconium, zinc, nickel, cadmium, copper, chromium and titanium. Most often employed as the complexing metal are zirconium and zinc.

Use of these complexing metals in carboxyl group-containing, aqueous emulsion compositions is well known in the art and is extensively discussed in prior patent literature. It is usually preferred to form a water-soluble complex of the particular metal to be used which complex will release the metal and make it available for transfer to the carboxyl groups, that is, for forming complex reaction products with available carboxyl groups in the polish formulation. An often preferred method of providing such a water soluble form of the metal is to prepare a complex reaction product of a salt of the metal with ammonium carbonate and ammonium hydroxide. Preferably, the metal salt reacted with the ammonium carbonate and ammonium hydroxide is itself a water soluble salt. Thus, in the case of zirconium, for example, suitable water-soluble salts for reacting with the ammonium carbonate and ammonium hydroxide include zirconium oxychloride octahydrate, zirconium tetrachloride, zirconium sulfate, zirconium nitrate, etc. With some of the metals, however, complex reaction products similar to, or the same as, those resulting from the reaction of the metal salt with ammonium carbonate and ammonium hydroxide are already commercially available. Ammonium zirconyl carbonate is one example of a suitable, commercially available source of zirconium for use as the carboxyl-reactive complexing metal in the polish compositions of the present invention.

Incorporation of the carboxyl-reactive complexing metal into the polish composition of the present invention can be, for example, by adding the metal—in water-soluble form—to an aqueous emulsion already containing the polymeric film-former, the carboxyl-containing leveling resin and the hydrocarbon wax, or, if desired, by first adding the metal to an aqueous solution of the styrene-maleic anhydride leveling resin and then combining that resultant solution with an emulsion of the film-former and hydrocarbon wax. Generally, however, the order of addition of the components of the polish composition is not critical and may vary from either of the above techniques. It has been found, however, where a zirconium-ammonium-carbonate complex is used to supply the complexing metal that it is usually preferred to withhold addition of the complex until all of the other components of the polish are present in the emulsion. Contrastingly, in the case of a zinc-ammonium-carbonate complex it is often preferred to first form an emulsion of the polymeric film-former, e.g., an acrylate polymer, and serially add: the zinc complex, the partially esterified styrene-maleic anhydride copolymer (preferably as an aqueous solution) and the hydrocarbon wax (also preferably as a wax emulsion).

The amount of carboxyl-reactive complexing metal included in the compositions of the present invention may, like the other components, vary between wide limits. Generally, however, there will be present about 0.01 to 0.5, preferably about 0.1 to 0.3, weight percent of complexing metal, calculated, as the free metal, based on total non-volatile materials in the composition.

The alkalinity of the polish compositions of the present invention may be supplied by the addition of any suitable organic or inorganic base. It is often preferred, however, to employ aqueous ammonia or another source of ammonium ions to provide a suitable alkaline pH for the composition.

In addition to the basic components discussed above, it is to be understood that various other ingredients commonly included in aqueous emulsion polish compositions may additionally be present. Emulsifying aids, for example, will most often be present in minor amounts, and suitable emulsifiers, or surfactants, include, for example, phenol-ethylene oxide condensates, fatty acid soaps, etc.

Similarly, there may also be employed minor amounts of plasticizers such as tri-butoxyethyl phosphate; emulsion stabilizers such as fatty acids (saturated or unsaturated) of about 9 to 18 carbon atoms, e.g., oleic acid, ethylene oxide condensates with, for instance, nonyl phenol, e.g., in molar ratio of about 10 to 40:1, respectively, and glycols, e.g., ethylene glycol; coalescing aids such as 2-pyrrolidone and "Carbitol," etc. Compositions of the present invention wherein zirconium is employed as the complexing metal are, for example, advantageously rendered emulsion stable by the inclusion of the fatty acid stabilizers, and zinc-containing emulsions, for example, are advantageously stabilized with ethylene oxide condensate-based non-ionic surfactants such as the ethylene oxide-nonyl phenol condensates.

The amount of solvent, i.e., water, employed in the polish composition will be that sufficient to provide a stable emulsion having a viscosity suitable for applying thin coatings therewith. This will often require sufficient water to provide a composition having a non-volatile materials content of about 12 to 20 weight percent. It is also intended, however, that polish concentrates, requiring dilution prior to use, be embraced within the scope of the invention.

The invention will be better understood by reference to the following examples:

EXAMPLE I

An aqueous, alkaline solution of the partially-esterified styrene-maleic anhydride copolymer identified in the tables and ammonium zirconyl carbonate was prepared by incremental addition of ammonium zirconyl carbonate to a 15% ammoniacal solution of the styrene-maleic anhydride resin. About 1% of the total quantity of ammonium zirconyl carbonate was added initially. A hard precipitate formed which redissolved after 15–30 minutes stirring. A light, feathery precipitate, which redissolved readily, formed when the remaining ammonium zirconyl carbonate was added. Typically as the ammonium zirconyl carbonate was added, the viscosity of the solution being formed was higher than that of the initial resin solution. Table I–A illustrates a procedure for preparation of the resin solution; Table I–B illustrates a procedure for addition of zirconium to the leveling resin solution.

TABLE I–A

Hydrolysis of styrene-maleic anhydride copolymer (leveling resin)

| Components: | Parts by weight |
|---|---|
| Leveling resin [1] | 150 |
| 28% ammonium hydroxide | 60 |
| Water | 790 |
| | 1000 |

[1] A 2:1 styrene-maleic anhydride copolymer which is about 70% half-esterified with n-propanol; mol. wt.: 2100; acid number: 210–230.

Procedure (1) Charge stirred vessel with water.
(2) Slowly add leveling resin.
(3) Heat resin-water slurry to 60–70° C.
(4) Add ammonium hydroxide and continue heating until solution is complete.
(5) Strain or filter solution.

Typical physical characteristics of the resultant solution

| | |
|---|---|
| Non-volatile material (NVM) percent | 15.0 |
| pH | 9.0–9.5 |
| Gardner color | <1 |
| Viscosity cps | 23 |

TABLE I-B

Preparation of leveling resin-zirconium solution

| Sample No | 1 | 2 | 3 | 4 |
|---|---|---|---|---|
| Resin solution [1] (grams) | 350 | 350 | 350 | 350 |
| Ammonium zirconyl carbonate [2] (mls.) | 6.74 | 13.48 | 20.22 | 26.96 |
| Non-volatile material, wt. percent of soln | 14.6 | 14.2 | 13.9 | 13.6 |
| pH of solution | 9.45 | 9.41 | 9.30 | 9.20 |
| Viscosity (cps. at 25° C.) | 399 | 4,880 | 29,150 | 64,720 |
| Wt. percent zirconium (by analysis) | 0.185 | 0.355 | 0.505 | 0.676 |
| Color | | Water white | | |

[1] Resin solution prepared as in Table I-A.
[2] Aqueous solution assaying about 10% $ZrO_2$.
NOTE.—Procedure: Ammonium zirconyl carbonate was added incrementally over a 30–45 minute period to the stirred resin solution. Stirring was continued 30–60 minutes or until all the precipitate which formed on addition was redissolved.

EXAMPLE II

Another solution of zirconium and leveling resin (Sample No. ) was prepared by an alternative method, differing from that disclosed in Example I in that the styrene-maleic anhydride copolymer was hydrolyzed in the presence of the ammonium zirconyl carbonate. Table II discloses the preparation.

TABLE II

Preparation of a leveling resin-zirconium solution (Sample No. 5)

| Components: | | Amounts |
|---|---|---|
| (1) Water | mils | 375 |
| (2) Leveling resin [1] | grams | 75 |
| (3) "Tergitol NPX" [2] | do | 0.1 |
| (4) Ammonium carbonate | do | 15 |
| (5) Water | mils | 90 |
| (6) Ammonium zirconyl carbonate | do | 18 |

[1] A 2:1 styrene-maleic anhydride copolymer which is about 70% half-esterified with n-propanol; mol. wt.: 2100; acid number: 210–230.
[2] Commercial non-ionic surfactant reported to be a condensate of nonyl phenol with 10.5 moles of ethylene oxide.

Procedure

Charge 1, 2 and 3 to a stirred resin kettle and heat to 50° C.
Mix 4 and 5 and charge to kettle.
Incrementally add 6 over a 30–45 minute period.
Continue stirring 30–60 minutes or until all precipitate is dissolved.

Typical physical characteristics

Color ..... Water white.
pH ..... 8.0 (adjusted with ammonium hydroxide).
Viscosity ..... Viscous.

EXAMPLE III

Employing the zirconium-leveling resin solutions described in Examples I and II, aqueous emulsion polish compositions were prepared according to the formulations shown in Table III. The polishes were applied to black rubber tile at a spreading rate of 526 sq. ft. per gallon of polish composition. After curing for 24 hours at ambient conditions, performance charatceristics of the dried films were investigated. Removability and detergent resistance were measured using a Gardner straight line washability machine equipped with a bristle brush.

TABLE III

| Formulation No | 1 | 2 | 3 | 4 | 5 |
|---|---|---|---|---|---|
| Components, part by volume: | | | | | |
| Acrylate polymer emulsion (15% NVM) [1] | 65 | 65 | 65 | 65 | 65 |
| Leveling resin solution [2] | 25 | | | | |
| Sample No. 1 (leveling resin-Zr soln.) | | 25 | | | |
| Sample No. 2 (leveling resin-Zr soln.) | | | 25 | | |
| Sample No. 3 (leveling resin-Zr soln.) | | | | 25 | |
| Sample No. 4 (leveling resin-Zr soln.) | | | | | 25 |
| Polyethylene emulsion (15% NVM) [3] | 10 | 10 | 10 | 10 | 10 |
| Tri-butoxyethyl phosphate | 1.2 | 1.2 | 1.2 | 1.2 | 1.2 |
| 2-pyrrolidone | 0.5 | 0.5 | 0.5 | 0.5 | 0.5 |
| Properties of polish: | | | | | |
| pH | 7.6 | 8.8 | 8.75 | 8.75 | 8.76 |
| Wt. percent zirconium | | 0.047 | 0.094 | 0.126 | 0.186 |
| Initial viscosity (cps. at 25° C.) | | 23.4 | 26.4 | 27.6 | 27.6 |
| Viscosity after having been heated 4 days at 54° C. (cps. at 25° C.) | No change | 30 | 124 | 130 | 136 |
| Performance characteristics: | | | | | |
| Detergent resistance, 2% potassium oleate soln. (cycles/percent removed) | 300/100 | 500/40 | 500/25 | 500/0 | 500/0 |
| "Spic and Span" soln. [4] (cycles/percent removed) | 250/90 | 250/90 | 250/90 | 250/0 | 250/0 |
| Removability, "Spic and Span" plus household ammonia soln. [5] (cycles/percent removed) | 12/100 | 15/100 | 15/100 | 20/100 | 20/100 |

[1] Commercial aqueous emulsion of methyl methacrylate-ethyl-acrylate-methacrylic acid terpolymer ("Rhoplex B-231").
[2] Resin solution prepared as in Table I-A but with pH of about 7.8.
[3] Commercial, carboxylated polyethylene ("AC-680") emulsified with 19 grams oleic acid and 19 grams morpholine/100 grams polyethylene.
[4] ¼ cup "Spic and Span"/gallon of water.
[5] ¼ cup "Spic and Span" plus 1 cup household ammonia/gallon of water.

The data in Table III illustrate the excellent properties of detergent resistance and ammonia-removability obtained with films prepared from polish compositions of the present invention (Formulation Nos. 2–5) wherein the polymeric film-former is an acrylate terpolymer, the leveling resin is n-propanol-esterified styrene-maleic anhydride copolymer, the hydrocarbon wax is polyethylene and the complexing metal is zirconium. Detergent resistance is seen to be much improved over films prepared from compositions having no complexing metal present (Formulation 1); yet there was no significant lessening of the ammonia-removability property by the inclusion of the complexing metal.

EXAMPLE IV

The detergent resistance of films formed with the improved polish compositions of the present invention, i.e., using the styrene-maleic anhydride leveling resin, was compared with that of films prepared from other, complexing metal-containing polishes wherein leveling resins other than the styrene-maleic anhydride copolymer were employed. The tests were performed as in Example III. Also determined was the viscosity stability of the various polish compositions. Test data are reported in Tables IV–A and IV–B. The polish compositions listed therein were prepared by admixing the components in the order listed, with the ammonium zirconyl carbonate being added last, i.e., after the base emulsion had been stirred for 30 minutes; the final composition was then stirred an additional 30 minutes. The data in Tables IV–A and B illustrate the vastly improved detergent resistance demonstrated by films prepared from the compositions of the present invention. Stability of the emulsions was generally good except in some instances where the larger concentrations of styrene-maleic anhydride copolymer leveling resin were employed, e.g., Formulation Nos. 10 and 12. In those cases undesirable viscosity rise was exhibited after heating for 5 days at 130° F. In other formulations (not reported in the tables) emulsion stability is achieved, however, by the addition of oleic acid in minor, stabilizing amounts to these compositions, while excellent detergent resistance and ammonia-removability properties are retained.

is continued for about 30 to 60 minutes until all of the zinc oxide is in solution. The resulting solution has a pH of about 9.82 and a zinc content of about 6.1 weight percent.

Employing the above zinc-ammonium-carbonate solution as the source of complexing metal, a polish composition with a zinc concentration of about 0.13 wt. percent was prepared according to the present invention. The

TABLE IV-A

| Formulation No. | 6 | 7 | 8 | 9 | 10 |
|---|---|---|---|---|---|
| Components, parts by volume: | | | | | |
| Acrylate polymer emulsion [1] | 65.0 | 65.0 | 65.0 | 65.0 | 65.0 |
| Polyester resin solution [2] | 25.0 | 6.25 | 12.5 | 18.75 | |
| Styrene-maleic anhydride resin solution [3] | | 18.75 | 12.5 | 6.25 | 25.0 |
| Polyethylene emulsion [4] | 10.0 | 10.0 | 10.0 | 10.0 | 10.0 |
| Tri-butoxyethyl phosphate | 1.2 | 1.2 | 1.2 | 1.2 | 1.2 |
| 2-pyrrolidone | 0.5 | 0.5 | 0.5 | 0.5 | 0.5 |
| Ammonium zirconyl carbonate | 2.18 | 2.18 | 2.18 | 2.18 | 2.18 |
| Properties of polish: | | | | | |
| Wt. percent zirconium | 0.4 | 0.4 | 0.4 | 0.4 | 0.4 |
| Polish pH | 8.2 | 8.0 | 8.0 | 8.0 | 7.85 |
| Polish viscosity (cps. at 25° C.) | 15.0 | 18.5 | 20.3 | 19.0 | 37.5 |
| Viscosity after 5 days at room temperature | 16.2 | 29.0 | 20.5 | 18.5 | |
| Viscosity after 5 days at 130° F. (cps. at 25° C.) | 16.3 | 26.5 | 21.0 | 19.5 | [5] 3,400 |
| Viscosity after 13 days at 130° F. (cps. at 25° C.) | | 35.0 | 21.5 | 19.5 | |
| Performance characteristics: | | | | | |
| Detergent resistance, 2% potassium oleate solution (cycles for 100% film removal) | <50 | 185 | 145 | 130 | 500 |

[1] Commercial aqueous emulsion of methyl methacrylate-ethyl acrylate-methacrylic acid terpolymer ("Rhoplex B-231") at 15% NVM.
[2] Commercial, thermoplastic polyester leveling resin ("Durez 19788") dissolved in aqueous ammonium hydroxide to 15% NVM. The resin is reported to be a rosin-maleic anhydride adduct condensed with polyol; mol. wt.=720; acid no.=200.
[3] Prepared as in Table IA but with pH of about 7.85.
[4] Commercial, carboxylated polyethylene ("AC-680") emulsified with 19 grams oleic acid and 19 grams morpholine/100 grams polyethylene.
[5] 2 days.

TABLE IV-B

| Formulation No. | 11 | 12 | 13 | 14 | 15 |
|---|---|---|---|---|---|
| Components, parts by volume: | | | | | |
| Acrylate polymer emulsion [1] | 65.0 | 65.0 | 65.0 | 65.0 | 65.0 |
| Polyester resin solution [2] | 25.0 | 6.25 | 12.5 | 18.75 | |
| Styrene-maleic anhydride resin solution [3] | | 18.75 | 12.5 | 6.25 | 25.0 |
| Polyethylene emulsion [4] | 10.0 | 10.0 | 10.0 | 10.0 | 10.0 |
| Tri-butoxyethyl phosphate | 1.2 | 1.2 | 1.2 | 1.2 | 1.2 |
| 2-pyrrolidone | 0.5 | 0.5 | 0.5 | 0.5 | 0.5 |
| Ammonium zirconyl carbonate | 1.09 | 1.09 | 1.09 | 1.09 | 1.09 |
| Properties of polish: | | | | | |
| Wt. percent zirconium | 0.2 | 0.2 | 0.2 | 0.2 | 0.2 |
| Polish pH | 8.25 | 8.0 | 8.1 | 8.25 | 7.8 |
| Polish viscosity (cps. at 25° C.) | 17.5 | 65.5 | 21.3 | 19.6 | 20.0 |
| Viscosity after 5 days at room temperature | 17.4 | | 19.0 | 21.0 | |
| Viscosity after 5 days at 130° F. (cps. at 25° C.) | 17.0 | [5] 1,000 | 19.5 | 19.5 | |
| Viscosity after 30 days at 130° F. (cps. at 25° C.) | | | 20.5 | 22.8 | 33.0 |
| Performance characteristics: | | | | | |
| Detergent resistance, 2% potassium oleate solution (cycles for 100% film removal) | 200 | 330 | 330 | 200 | 295 |

[1] Commercial aqueous emulsion of methyl methacrylate-ethyl acrylate-methacrylic acid terpolymer ("Rhoplex B-231") at 15% NVM.
[2] Commercial, thermoplastic polyester leveling resin ("Shanco 1165-S") dissolved in aqueous ammonium hydroxide to 15% NVM. Resin is reported to be a rosin-maleic anhydride adduct condensed with polyol; mol. wt.=600, acid number=190.
[3] Prepared as in Table I-A but with pH of about 7.85.
[4] Commercial, carboxylated polyethylene ("AC-680") emulsified with 19 grams oleic acid and 19 grams morpholine/100 grams polyethylene.
[5] 2 days.

EXAMPLE V

An aqueous solution of zinc, ammonium and carbonate ions is prepared by slurrying together 89 gms. of fine particle size French Process zinc oxide, 100 ml. of 28% ammonium hydroxide, 711 ml. of water and 100 gms. of ammonium carbonate. Stirring at room temperature polish formulation and its performance characteristics, in terms of detergent resistance and ammonia-removability of films prepared therewith, are reported in Table V. The formulation, which had a pH of about 7.78, was prepared by blending the components in the order listed and stirring for 30 to 60 minutes.

TABLE V

Formulation No. 16

Components:

| | Parts by volume |
|---|---|
| Acrylate polymer emulsion [1] | 65.0 |
| "Tergitol NPX" | 1.0 |
| Ethylene glycol | 1.5 |
| Zinc ammonium carbonate solution | 2.1 |
| Styrene-maleic anhydride resin solution [2] | 25.0 |
| Polyethylene emulsion [3] | 10.0 |
| Tri-butoxyethyl phosphate | 1.2 |
| 2-pyrrolidone | 0.5 |

Performance characteristics:

| | percent |
|---|---|
| Film removal after scrubbing with "Spic and Span" solution for 500 cycles [4] | 10 |
| Film removal after scrubbing with "Spic and Span"/ammonia solution for 100 cycles [5] | 70 |

[1] "Rhoplex B-231."
[2] Prepared as in Table L-A but with pH of about 7.7.
[3] Commercial, carboxylated polyethylene ("AC-680") emulsified with 19 grams oleic acid and 19 grams morpholine/100 grams polyethylene.
[4] Polishes were applied to black rubber tile at 526 ft.$^2$/gal. Detergent resistance was evaluated by scrubbing panels with 2% potassium oleate solution (pH adjusted to 10 with 28% NH$_4$OH) after 24 hours cure at ambient conditions. The Gardner straight line washability machine affixed with a bristle brush was used for scrubbing the test films.
[5] Film removal was evaluated by scrubbing the test films applied and cured under the same conditions as described in 4 except that a stripper solution composed of ¼ cup "Spic and Span" and 1 cup household ammonia solution per gallon of water was used.

The data in Table V illustrate the excellent detergent resistance properties of films prepared from polish compositions of the present invention wherein zinc is employed as the complexing metal.

It is claimed:

1. An aqueous emulsion polish composition having a pH of greater than 7; comprising,
   (a) an emulsifiable hydrocarbon wax having a molecular weight of 3,000 to 15,000,
   (b) a carboxyl group-reactive complexing metal selected from the group consisting of zirconium, zinc, nickel, cadmium, copper, chromium, and titanium,
   (c) a carboxyl group-containing leveling resin of a 50 to 100 percent half esterified copolymer of styrene and maleic anhydride esterified with an aliphatic monohydric alkanol of 1 to 10 carbon atoms as the only esterifying agent, wherein the molar ratio of styrene to maleic anhydride in the copolymer is 1.5 to 2.5:1, said copolymer being soluble in aqueous alkaline media and said copolymer having an unesterified molecular weight of 600 to 6,000 and said esterified copolymer having an acid number of 175 to 275, and
   (d) a polymeric emulsifiable synthetic film-former other than said leveling resin, having a molecular weight of 10,000 to 50,000 obtained by addition polymerization of monomers consisting essentially of mono-olefinically unsaturated monomer of 2 to 12 carbon atoms;

said composition when applied as a film is resistant to detergents and removable with household ammonia.

2. The composition of claim 1 wherein the carboxyl group-reactive complexing metal is selected from the group consisting of zirconium and zinc.

3. The composition of claim 2 wherein the copolymer of styrene and maleic anhydride is esterified with a monohydric alkanol of 1 to about 5 carbon atoms.

4. The composition of claim 2 wherein the copolymer has an unesterified molecular weight of about 600 to 2,500.

5. The composition of claim 2 wherein the esterified copolymer has an acid number of about 180 to 250.

6. The composition of claim 2 wherein the carboxyl group-reactive complexing metal is supplied as a complex reaction product formed from a salt of said metal, ammonium carbonate and ammonium hydroxide.

7. The composition of claim 6 wherein the carboxyl group-reactive complexing metal is supplied as ammonium zirconyl carbonate.

8. The composition of claim 4 wherein the unesterified molecular weight of the copolymer is about 2100.

9. The composition of claim 6 wherein the esterified copolymer has an acid number of 210 to 230.

10. The composition of claim 3 wherein the molecular weight of the unesterified copolymer is about 2100 and the acid number of the esterified copolymer is between 210 and 230.

References Cited

UNITED STATES PATENTS

| | | | |
|---|---|---|---|
| 3,308,078 | 3/1967 | Rogers et al. | 260—27 |
| 3,392,155 | 7/1968 | Muskat | 260—78.5 |

THEODORE MORRIS, Primary Examiner

U.S. Cl. X.R.

260—78.5 T, 874, 901